United States Patent [19]
Mayer et al.

[11] Patent Number: 5,367,689
[45] Date of Patent: Nov. 22, 1994

[54] APPARATUS FOR STRICTLY ORDERED INPUT/OUTPUT OPERATIONS FOR INTERRUPT SYSTEM INTEGRITY

[75] Inventors: Dale J. Mayer, Houston; John A. Landry, Tomball; Paul R. Culley, Cypress, all of Tex.

[73] Assignee: Compaq Computer Corporation, Houston, Tex.

[21] Appl. No.: 955,508

[22] Filed: Oct. 2, 1992

[51] Int. Cl.⁵ .............................................. G06F 9/00
[52] U.S. Cl. .................................... 395/725; 395/550; 364/271.6; 364/271.7; 364/DIG. 1
[58] Field of Search ........................ 395/725, 325, 550; 364/271.6, 271.7, DIG. 1, 741.7, 950, 950.2, DIG. 2

[56] References Cited

U.S. PATENT DOCUMENTS

| | | | |
|---|---|---|---|
| 4,835,681 | 5/1989 | Culley | 364/DIG. 1 |
| 5,065,313 | 11/1991 | Lunsford | 395/275 |
| 5,109,493 | 4/1992 | Banerjee | 395/325 |
| 5,109,517 | 4/1992 | Houda et al. | 395/800 |
| 5,247,654 | 11/1992 | Hamid | 395/550 |
| 5,247,685 | 9/1993 | Landry et al. | 395/725 |

OTHER PUBLICATIONS

Japanese Abstract, Publication No. JP59052324, dated Mar. 26, 1984, Entitled Detecting Circuit For Service Interruption And Its Recovery.
Method Of Keeping Distributed Interrupt Requests Consistent, IBM Technical Disclosure Bulletin, vol. 33, No. 11, Apr. 1991, pp. 208-209.
Method Of Improving Parallel Port Interrupts In Personal Computers, IBM Technical Disclosure Bulletin, vol. 35, No. 1A, Jun. 1992, pp. 54-58.

Primary Examiner—Allen R. MacDonald
Assistant Examiner—Glenn A. Auve
Attorney, Agent, or Firm—Pravel, Hewitt, Kimball & Krieger

[57] ABSTRACT

A method and apparatus which maintains strict ordering of processor cycles to guarantee that a processor write, such as an EOI instruction, is not executed to the interrupt controller prior to the interrupt request from a requesting device being cleared at the interrupt controller, thus maintaining system integrity. Interrupt controller logic is included on each respective CPU board. The processor can access the interrupt controller over a local bus without having to access the host bus or the expansion bus and thus an interrupt controller access could be completed before a previously generated I/O cycle has completed. Therefore, the apparatus which tracks expansion bus cycles and interrupt controller accesses and maintains strict ordering of these cycles to guarantee that an interrupt request is cleared at the interrupt controller prior to execution of write operation to the interrupt controller.

8 Claims, 8 Drawing Sheets

APPARATUS FOR STRICTLY ORDERED INPUT/OUTPUT OPERATIONS FOR INTERRUPT SYSTEM INTEGRITY

FIELD OF THE INVENTION

The present invention relates to interrupt handling in computer systems, and more particularly to a method and apparatus for providing strict ordering of interrupt-related input/output (I/O) operations to maintain the integrity of the interrupt system.

DESCRIPTION OF THE RELATED ART

Currently, most personal computer systems utilize two or more buses to interconnect the various components comprising the system. In one popular type of personal computer system, the processor or processors are connected to a processor/memory bus, commonly called a host bus, and the host bus is in turn coupled to an input/output bus or expansion bus. The expansion bus generally includes a number of slots for receiving optional add-in boards such as network interface cards, hard disk cards, or video cards. Other types of I/O devices such as the floppy disk controller, the keyboard controller, or various other types of peripherals may be connected to the expansion bus or optionally may be connected to a third bus, as necessary.

Most personal computer systems today are also interrupt driven, meaning that a peripheral or I/O device gains access to the services of the microprocessor by asserting an interrupt. An interrupt essentially acts as an external asynchronous input to the processor that informs the processor that it should complete its current instruction and then fetch a new routine that is used to service the requesting device. Once the interrupt servicing is complete, the processor resumes where it left off.

Interrupt driven computer systems generally include a device referred to as an interrupt controller that functions as an overall manager of the interrupt environment. One example of an interrupt controller used in personal computer systems is the Intel 8259 Programmable Interrupt Controller. The 8259 interrupt controller receives requests, i.e., interrupts, from the peripheral equipment and I/O devices, determines which of the incoming requests has the highest priority, and issues an interrupt to the CPU. Each peripheral or I/O device generally includes a special program or routine that is associated with its specific functional or operational requirements, referred to as an interrupt service routine. After asserting an interrupt to the CPU, the interrupt controller provides a vector or pointer to the CPU which points to the interrupt service routine that must be performed to service the requesting device.

Therefore, when a peripheral or I/O device generates an interrupt, the processor executes the appropriate interrupt service routine to service the requesting device. At the end of each interrupt service routine there are generally two instructions that are used to clear the interrupting device and the interrupt controller, respectively. One instruction causes the processor to execute an I/O operation to the requesting I/O or peripheral device to clear the interrupt request. This I/O instruction propagates down through the host bus and the expansion bus to the respective peripheral device, directing it to discontinue asserting its interrupt line. The other instruction is usually an EOI or end of interrupt instruction and is used to clear the interrupt controller.

A brief discussion of the function of the EOI instruction is deemed appropriate. As previously discussed, when the interrupt controller receives an interrupt request from a requesting device, the interrupt controller asserts an interrupt to the processor. Upon receiving an interrupt acknowledge from the processor, the interrupt controller sets a bit in a register referred to as the in service register. This bit is used to remind the interrupt controller that an interrupt is currently being serviced. The EOI instruction clears the respective bit in the in service register to inform the interrupt controller that the interrupt service routine has been completed. When the EOI instruction has been performed and the interrupt service routine has effectively been completed, the processor then executes the last instruction in the interrupt service routine, a return instruction referred to as an IRET instruction, which returns the processor to its original state prior to the interrupt.

Currently, personal computer systems are designed such that the interrupt controller is connected to the expansion bus. This arrangement generally requires that the microprocessor utilize the host bus and the expansion bus in accessing the interrupt controller. In applications which require a large amount of interrupts, the placement of the interrupt controller on the expansion bus requires a large amount of host bus and expansion bus utilization, thus reducing system efficiency. Since the microprocessor must utilize both the host bus and expansion bus to clear the interrupt controller at the end of each interrupt service routine, the occurrence of a large number of interrupts greatly reduces system efficiency.

Partially in response to the above inefficiency, U.S. patent application Ser. No. 07/955,683, titled ARRANGEMENT OF DMA, INTERRUPT AND TIMER FUNCTIONS TO IMPLEMENT SYMMETRICAL PROCESSING IN A MULTIPROCESSOR COMPUTER SYSTEM, filed concurrently with this application discloses a multiple processor computer system where respective interrupt controller logic for each processor is located on the respective CPU (central processing unit) board local to the processor. The system disclosed in the above-referenced application is discussed here to more fully explain the operation of the present invention and is not considered to be prior art as to the present application. In this system, general interrupt receive circuitry is coupled between the host bus and the expansion bus and operates to receive the interrupt signals from the various peripheral or I/O devices and funnel these interrupt signals to each of the respective CPU boards and its respective interrupt controller logic. Since the respective interrupt controllers are local to each of the CPU boards, a processor access to its respective interrupt controller does not require host bus or expansion bus utilization. For more information on this system, please see the above-referenced application, which is hereby incorporated by reference.

However, problems may arise when the interrupt controller is situated locally on the CPU board while the requesting I/O or peripheral device remains situated on the expansion bus. As noted above, at the end of an interrupt service routine, the processor must execute an I/O cycle to the requesting device to direct the requesting device to discontinue asserting its interrupt signal and then must execute an EOI instruction to clear the respective bit in the in service register in the interrupt controller. It is critical that these operations are executed in this order. For example, if the processor write cycle that clears the in service register is executed to the interrupt controller before the interrupt request from the requesting device is cleared at the input of the interrupt controller, then the in service register in the interrupt controller will be cleared, but the interrupt controller will still be receiving the interrupt signal from the respective device if the device is using level sensed interrupts. This will result in the interrupt controller believing that a new interrupt signal is being asserted by the device, thus causing the interrupt controller to generate a new interrupt to the processor. This will result in either a degradation in performance or possible erroneous operation.

This problem is less likely to occur in prior art systems because both the I/O cycle to clear the respective requesting device and the EOI instruction to the interrupt controller both required use of the expansion bus. In these prior art systems, strict ordering of these cycles was generally enforced because an access to the interrupt controller could not be executed before the I/O cycle that cleared the respective requesting device since each cycle required use of the expansion bus. However, problems did arise in the prior art when I/O write cycles were posted to the expansion bus, including the interrupt controller. For information on a solution to this problem, please see U.S. patent application Ser. No. 07/719,248 entitled "Input/Output Write Posting Prevention" now abandoned and continued as Ser. No. 08/075,862 which is hereby incorporated by reference.

In the system discussed above, a processor access to the interrupt controller does not require use of the host or expansion buses and thus occurs much more quickly than an I/O cycle, which must propagate out to the expansion bus, particularly because the I/O cycles to the expansion bus are posted, or returned complete before actual completion of the cycle. In this system, it is very likely that an EOI instruction performed by the processor after the respective I/O cycle to clear the requesting device may actually be executed to the interrupt controller before the I/O cycle has actually reached the requesting device or before the interrupt request has had time to clear at the input of the interrupt controller.

In addition, other problems may occur due to the local nature of the interrupt controller on each CPU board in the above system. For example, if the processor generated an I/O cycle to clear a requesting device and then generated an access to the interrupt controller to mask or unmask a bit in a mask register inside the interrupt controller, problems may arise if the interrupt controller access is completed prior to the interrupt request being cleared at the input of the interrupt controller. As with an EOI instruction, the completion of the interrupt controller access prior to the interrupt request being cleared may result in a spurious interrupt and either a degradation in system performance or possible erroneous operation.

Therefore, a method and apparatus is required to maintain strict ordering of the various bus cycles in a computer system to guarantee that the interrupt being generated by a requesting device is cleared at the input of the interrupt controller prior to the completion of a processor access to the interrupt controller.

SUMMARY OF THE INVENTION

The present invention comprises a method and apparatus which maintains strict ordering of certain interrupt-related processor cycles to guarantee that an EOI instruction or other processor write cycle is not executed to the interrupt controller prior to the interrupt request from a requesting device being cleared at the interrupt controller, thus maintaining system integrity. The computer system is preferably a multi-processor system wherein interrupt controller logic is included on each respective CPU board. In this manner, the processor can access the interrupt controller over a local bus without utilizing either the host bus or the expansion bus. If strict ordering of cycles was not enforced, the microprocessor initiated I/O cycle to clear the interrupt of a requesting device may actually reach the requesting device at a time later than the execution of a subsequent EOI instruction to the respective interrupt controller. Alternatively, the I/O cycle to clear the requesting device may reach the device prior to completion of the interrupt controller write, but the interrupt request may not have sufficient time to clear at the input of the interrupt controller before the interrupt controller write completes. Therefore, the present invention comprises an apparatus which tracks expansion bus cycles and interrupt controller accesses and maintains strict ordering of these cycles to guarantee that an interrupt request is cleared at the input of the interrupt controller prior to execution of a processor access, primarily an EOI instruction write, to the interrupt controller.

The apparatus monitors expansion bus cycles as well as I/O write operations to respective ports in the interrupt controller. When the apparatus detects a host bus cycle initiated by its respective processor that is currently destined for the expansion bus, a timer is loaded and an indicating signal is asserted. When the EISA cycle completes, the timer begins counting out a preset delay. If the apparatus detects a processor local bus access to the respective ports in the interrupt controller, indicating the performance of an EOI instruction or other interrupt controller write, at any time after the timer is loaded or while the timer is counting down, the apparatus extends the local bus cycle, preventing the cycle from completing, until the timer counts down to zero. This operates to extend the local bus cycle until the expansion bus cycle has completed with an additional delay provided by the timer after the expansion bus cycle has completed to allow the interrupt request time to clear or be deasserted back at the interrupt controller. The local bus cycle is then allowed to execute. This insures that the interrupt request from the respective requesting device is cleared at the input of the interrupt controller prior to the execution of a subsequent processor write to the interrupt controller.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
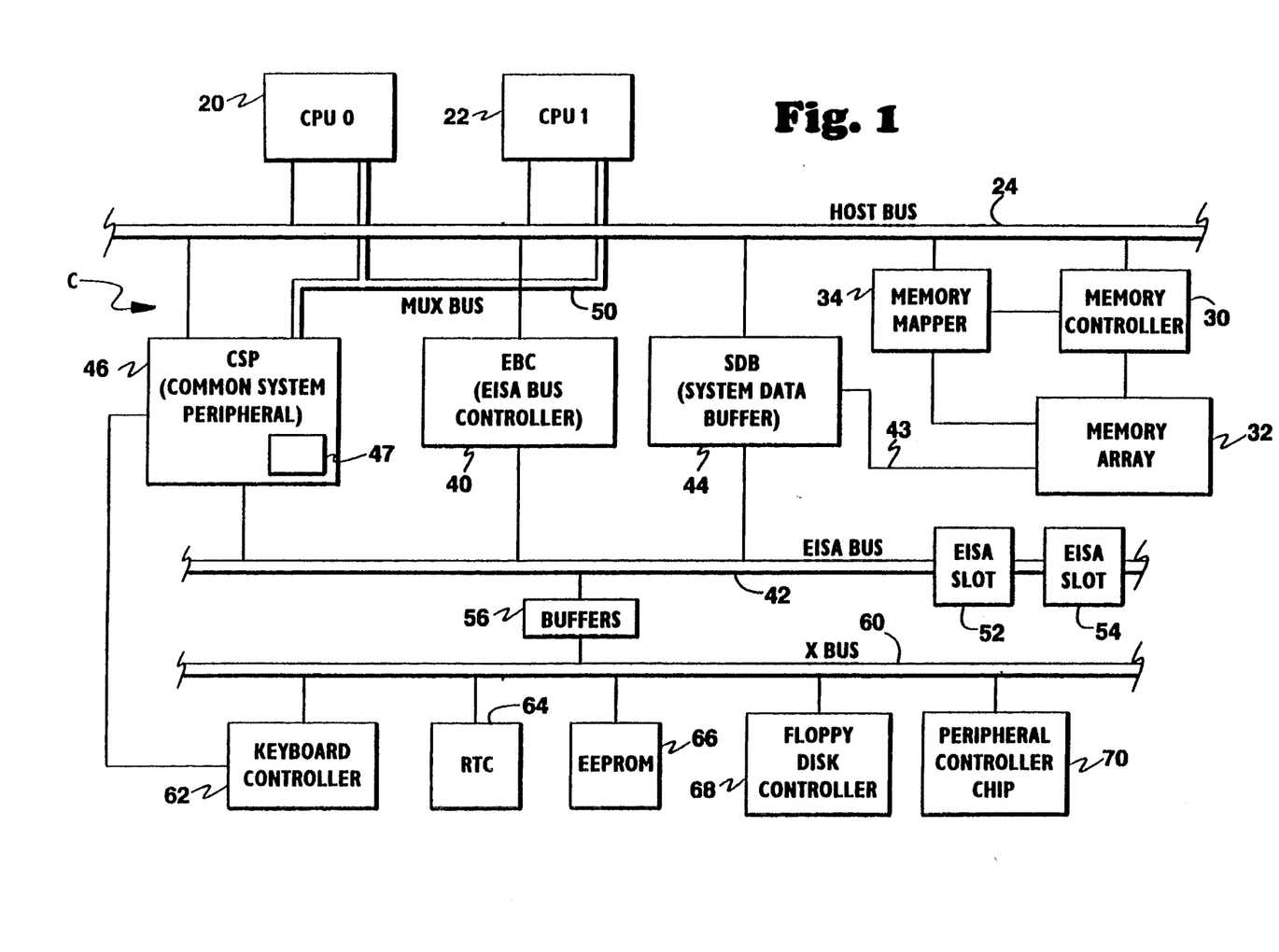
FIG. 1 is a block diagram of a computer system incorporating he present invention.

Referring now to FIG. 1, a computer system C is shown. The computer system C is a multiprocessor system in the preferred embodiment, although the present invention may be incorporated into a single processor system. The computer system elements that are not discussed in detail below are not significant to the present invention other than to illustrate an example of a fully configured computer system.

The computer system C includes two CPU boards referred to as CPU0 20 and CPU1 22 connected to a host bus 24. A memory controller 30 is coupled to the host bus 24 and a main memory array 32, preferably comprised of dynamic random access memory (DRAM), is coupled to the memory controller 30. Memory mapper logic 34 is coupled to the host bus 24, the memory controller 30 and the memory array 32. The memory mapper logic 34 provides memory mapping functions to facilitate memory accesses to the memory array 32.

A bus controller 40 is coupled between the host bus 24 and an expansion bus 42, preferably the Extended Industry Standard Architecture (EISA) bus. The bus controller 40 is preferably an EISA bus controller (EBC). The EBC 40 provides various bus cycle translation and conversion functions to facilitate transfers between the host bus 24, the EISA bus 42 and a memory bus 43. A system data buffer (SDB) 44 is also coupled between the host bus 24, the EISA bus 42 and the memory array 32 to allow data flow between the three elements. The SDB 44 is coupled to the memory array 32 by the memory bus 43. A logic block referred to as the common system peripheral (CSP) 46 is coupled between the host bus 24 and the EISA bus 42. The CSP 46 is also coupled through a MUX bus 50 to a logic block referred to as the distributed system peripheral (DSP) (FIG. 2) in each of CPU0 20 and CPU1 22. The CSP 46 is also coupled to a keyboard controller 62.

The CSP 46 includes various system functions including a direct memory access (DMA) controller, EISA arbitration controller, and numerous system board logic functions such as memory refresh control, among others (all not shown). The CSP 46 also includes interrupt receive logic 47 which receives various interrupt signals, IRQ3–IRQ12, IRQ14, and IRQ15 from the various peripheral and I/O devices and transmits these interrupt request signals to the DSP logic (FIG. 2) in each of CPU0 20 and CPU1 22 via the MUX bus 50. The CSP 46 also receives two interrupt signals from the keyboard controller 62, these being a keyboard interrupt signal and a mouse interrupt signal. When the keyboard interrupt signal is asserted, the CSP 46 generates an interrupt request signal referred to as IRQ1 that is provided over the MUX bus 50 to the DSP. Also, the CSP 46 combines the IRQ12 input with the mouse interrupt signal through an AND gate (not shown) before providing the IRQ12 signal to the MUX bus 50. The CSP 46 also internally generates an interrupt request signal referred to as IRQ13 from a correctable memory error signal referred to as CERR* and an internally generated DMA interrupt signal. These various interrupt request signals IRQ1–IRQ15 are provided through the MUX bus 50 to the DSP logic in each of CPU0 20 and CPU1 22. The interrupt signals used in the preferred embodiment are preferably level sensed interrupts, but may be edge sensitive to allow use of ISA circuit boards. For more information on the operation of the MUX bus 50, please see related copending application Ser. No. 07/955,482, entitled MULTIPLEXED COMMUNICATION PROTOCOL BETWEEN CENTRAL AND DISTRIBUTED PERIPHERALS IN MULTIPROCESSOR COMPUTER SYSTEMS, filed concurrently with this application, which is hereby incorporated by reference.

The EISA bus 42 includes a plurality of EISA slots 52 and 54 for receiving EISA and ISA expansion cards, for example, a network interface card or a hard disk interface card. The EISA bus 42 is coupled through buffers 56 to a bus referred to as the X bus 60. A number of peripheral devices are coupled to the X bus 60 including the keyboard controller 62, a real time clock (RTC) 64, EEPROM (electrically erasable programmable read only memory) 66, a floppy disk controller 68, and a peripheral controller chip 70 which includes numerous parallel ports and UARTS (universally asynchronous receiver/transmitters).

Figure 2:
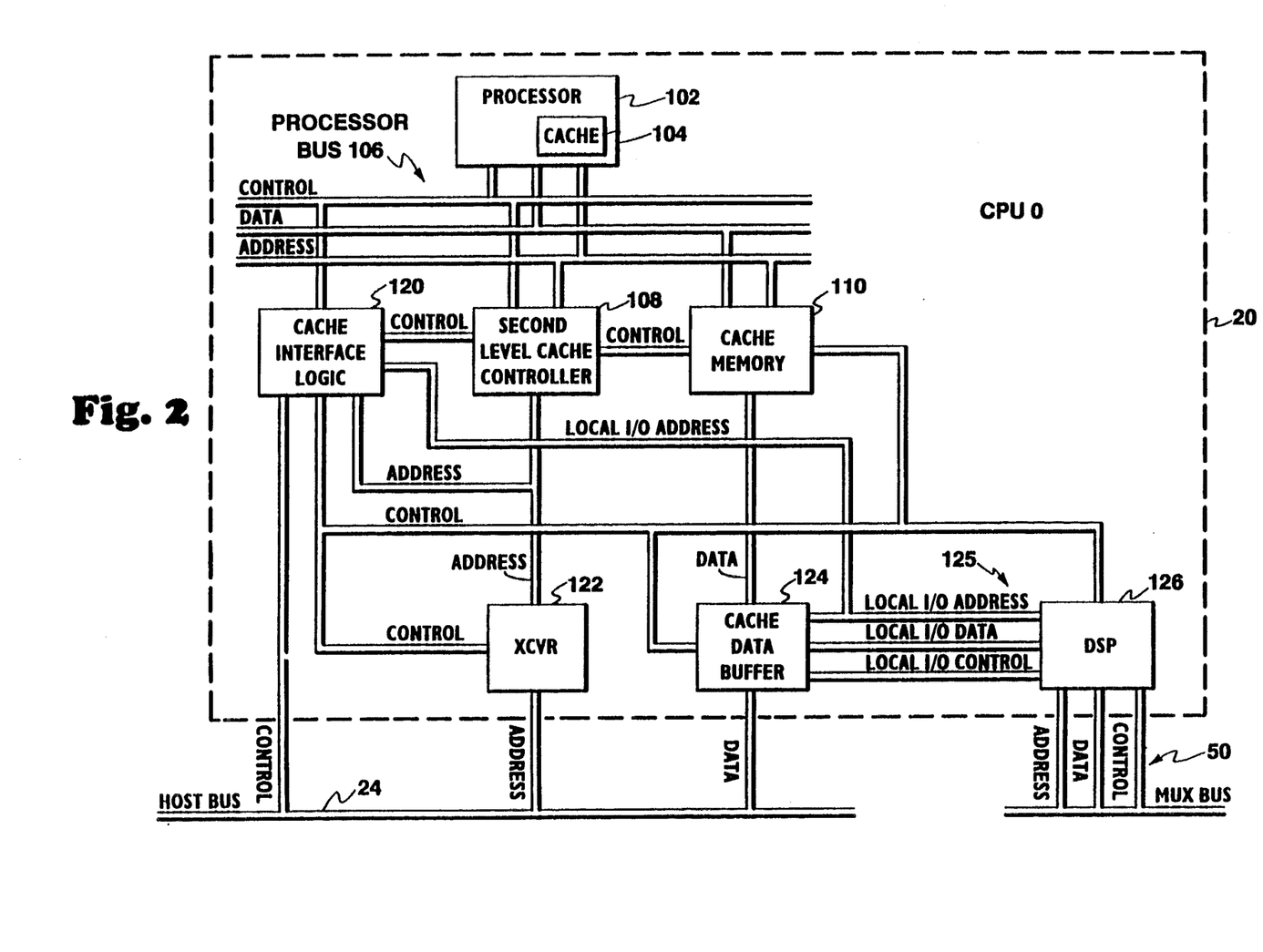
FIG. 2 illustrates a CPU board of FIG. 1.

Referring now to FIG. 2, a block diagram of CPU0 20 is shown. CPU0 20 and CPU1 22 operate in a similar manner, the primary difference being that only CPU0 20 generates a memory refresh in the preferred embodiment. Therefore, only CPU0 20 is described below for simplicity, and the following description applies equally well to CPU1 22. CPU0 20 includes a processor 102 which preferably includes an internal cache 104. The processor 102 is preferably the Intel i486 processor. However, the use of other types of processors with or without an internal cache is also contemplated. The processor 102 is connected to a processor bus 106 including control, data and address portions, as shown.

A second level cache controller 108 is connected to the address and control portions of the processor bus 106. Cache memory 110 is connected to the address and data portions of the processor bus 106. The second level cache controller 108 connects to the cache memory 110 via various control lines as shown. The second level cache controller 108 is preferably the 82495 or C5 cache controller produced by Intel. The cache memory 110 preferably comprises the 82490 or C8 RAMs produced by Intel which are normally used with the C5 cache controller. The C5 is a second level cache controller for the i486 processor that works in conjunction with the C8 RAMs to provide a unified writeback data and instruction cache which is transparent to system software. Although this configuration is used in the preferred embodiment, other configurations may of course also be used.

Cache interface logic 120 is coupled to the second level cache controller 108 through control lines and is coupled to the control portion of the processor bus 106, as shown. The address pins of the second level cache controller 108 are connected to a transceiver 122, which in turn is connected to the host bus 24. The address pins of the second level cache controller 108 are also connected to the cache interface logic 120. The address lines coupled between the second level cache controller 108 and the transceiver 122 are bi-directional, meaning that the second level cache controller 108 can drive an address through the transceiver 122 onto the host bus 24, and can also receive an address from the host bus 24 through the transceiver 122 for snooping purposes. The data pins of the cache memory 110 are connected to a cache data buffer 124, which in turn is connected to the host bus 24. The cache data buffer 124 is connected to the DSP 126 via a local I/O bus 125 comprising local I/O address, data and control lines, as shown. The cache interface logic 120 provides a portion of the local I/O address to the local I/O address lines coupled between the cache data buffer 124 and the DSP 126.

The cache interface logic 120 is connected to the host bus 24 via control lines and also is connected to the address transceiver 122, the cache data buffer 124 and the DSP 126 via control lines. The control lines from the cache interface logic 120 to the address transceiver 122 and the cache data buffer 124 act as output enables for both the second level cache controller 108 and the cache memory 110. The cache memory 110 also provides control lines to the DSP 126. The DSP 126 is connected through the MUX bus 50 to the CSP 46 (FIG. 1).

The cache interface logic 120 provides the required bus controller functions to interface the second level cache system comprising the second level cache controller 108 and cache memory 110 with the host bus 24. The cache interface logic 120 provides necessary signal interpretation and translation functions between the second level cache controller 108 and the host bus 24. The cache interface logic 120 also controls the operations of the local I/O cycles.

When a processor I/O access occurs, the second level cache controller 108 broadcasts the requested address to the cache interface logic 120 and also provides the address to the address transceiver 122. The cache interface logic 120 performs an address decode to determine if the requested I/O address requires a EISA bus cycle or requires local access to ports in the DSP 126. If the address requires a host bus cycle, the cache interface logic 120 enables the address transceiver 122 to present the address onto the host bus 24. If the generated address is that of a port in the DSP 126, then the cache interface logic 120 reencodes the address into 5 bits and provides these bits to the DSP 126 as a portion of the local I/O address. The cache data buffer 124 provides the lower two bits of the local I/O address, these bits being used by the DSP 126 to develop byte enable signals.

Figure 3:
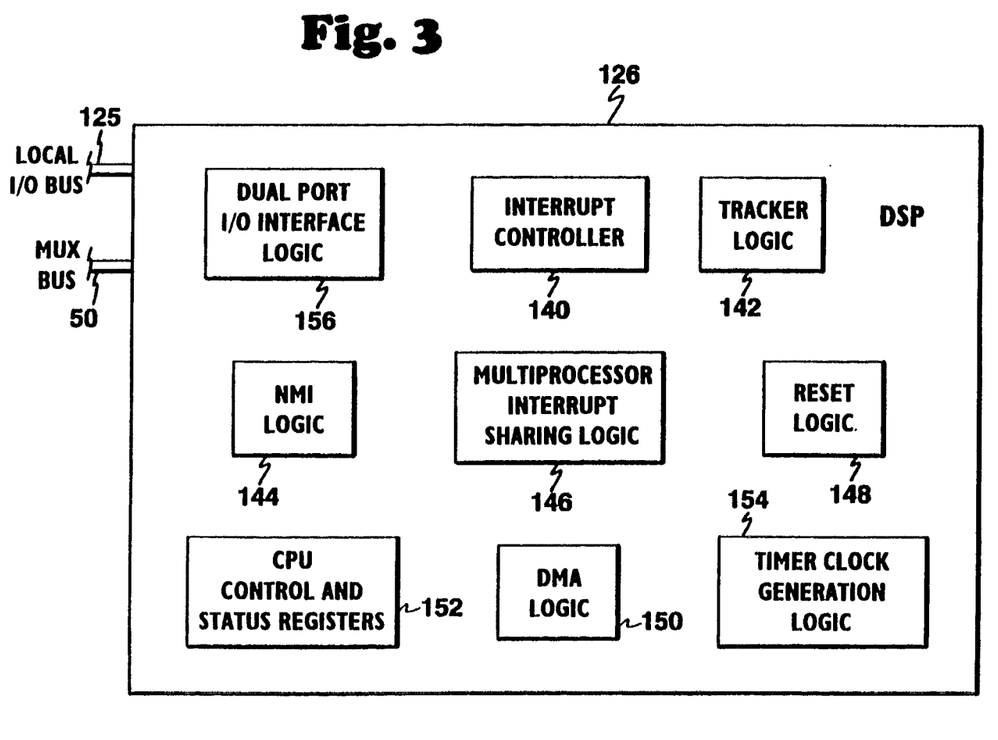
FIG. 3 is a more detailed block diagram of the distributed system peripheral (DSP) of FIG. 2.

The DSP 126 implements various logic functions that are closely related to the processor/cache subsystem. Referring now to FIG. 3, the DSP 126 includes interrupt controller logic 140, preferably comprising two cascaded Intel 8259 interrupt controllers which provide 15 levels of interrupts. The DSP 126 also includes tracker logic 142 according to the present invention. The tracker logic 142 monitors the execution of EISA cycles as well as accesses to certain ports in the interrupt controller logic 140 to guarantee that interrupt-related cycles are performed in the proper order. The tracker logic 142 is discussed further below. The DSP 126 also includes non-maskable interrupt (NMI) logic 144 and multiprocessor interrupt sharing logic 146. The multiprocessor interrupt sharing logic 146 allows a CPU to interrupt other CPUs at a selected interrupt level, thus providing an efficient multiprocessor communication capability. Also included are reset logic 148, DMA (direct memory access) logic 150, various CPU (direct memory access) control and status registers 152, timer clock generation logic 154, and dual port I/O interface logic 156. The dual port I/O interface logic 156 interfaces the various registers in the DSP 126 with the local I/O bus 125 and the MUX bus 50.

Referring again to FIG. 1, when an interrupt occurs in the computer system C, the respective interrupt request signal either is asserted to the interrupt receive logic 47 in the CSP 46 or, alternatively, the interrupt is generated internally in the CSP 46 as was described above. The CSP 46 provides this interrupt request signal over the MUX bus 50 to the respective DSP 126 in each of CPU0 20 and CPU1 22. Upon receipt of the respective interrupt request signal, the interrupt controller logic 140 in the DSP 126 asserts an interrupt to the respective processor 102. As discussed in the background, at some point during execution of the respective interrupt service routine, the processor 102 executes an I/O cycle to the respective requesting device, which may be situated on either the EISA bus 42 or the X bus 60, to clear the interrupt, i.e., to instruct the requesting device to deassert its interrupt signal, assuming the requesting device is using level sensed interrupts. The processor 102 then normally executes an EOI instruction to the interrupt controller 140 via the local I/O bus 125. Alternatively, the processor 102 may perform a write operation to the interrupt controller 140 to mask or unmask certain bits in mask registers inside the interrupt controller 140.

However, as discussed in the background, problems may arise because the operation of the local I/O bus 125 in transmitting a processor write to the interrupt controller 140 happens much more quickly than the I/O cycle to the requesting device, which must propagate to either of the EISA bus 42 or the X bus 60. As noted in the background, it is possible that the processor write will be performed to the interrupt controller 140 before the interrupt request has been deasserted at the interrupt request input of the interrupt controller 140. This can happen either if the write is performed to the interrupt controller 140 before the I/O cycle has had time to propagate down to the respective requesting device, or if the I/O cycle has reached the requesting device before the write has been performed, but the deassertion of the level sensed interrupt does not reach the input of the interrupt controller 140 before the write is actually performed to the interrupt controller 140. In either of these cases, if the interrupt controller access is an EOI instruction write, the in service register in the interrupt controller 140 will be cleared before the interrupt request signal is deasserted at the input of the interrupt controller 140, and thus the interrupt controller 140 will falsely believe that it is receiving another interrupt, resulting in a spurious interrupt. Also, if the write to the interrupt controller 140 is to mask or unmask an interrupt level or otherwise change the configuration of the interrupt controller 140, it is important that all prior undesired interrupt requests have been cleared at the input of the interrupt controller 140 before the change occurs. A spurious interrupt degrades system performance because the processor 102 is generally required to poll each device at that interrupt level to determine which one caused the interrupt. Thus, a spurious interrupt requires the processor 102 to poll every device at that priority level before it determines that the interrupt was spurious. In some instances, for example, if the processor 102 does not poll the devices at that interrupt level, a spurious interrupt can result in erroneous operation.

Therefore, the tracker logic 142 monitors the local I/O bus 125 for accesses, i.e., writes, to the interrupt controller 140 and extends a local I/O write cycle to the interrupt controller 140 if an EISA cycle provided by the respective CPU is executing or if a cycle is executing on the host bus 24 that is destined for the EISA bus 42 or if an EISA cycle has completed within a time-out period. The tracker logic 142 monitors the local I/O bus 125 for processor writes to port addresses 0020h, 0021h, 00A0h, and 00A1h, in the preferred embodiment. These addresses correspond to ports in the interrupt controller 140. When the tracker logic 142 detects a processor access to the interrupt controller 140, and a CPU cycle from its respective processor 102 is currently destined for the EISA bus or is in progress on the EISA bus, the tracker logic 142 extends the local bus cycle until the EISA bus cycle completes and then for an additional delay period. The tracker logic 142 delays the local I/O bus cycle for an additional period to allow for the interrupt request that was previously being asserted by the requesting device to clear at the interrupt request input of the interrupt controller 140. The local bus cycle is then allowed to execute. This insures that the source of the interrupt has been cleared prior to performance of the write to the interrupt controller 140.

The tracker logic 142 comprises three portions, these being decode logic, CPU cycle tracker logic and interrupt controller I/O tracker logic. The CPU cycle tracker logic monitors for a host bus cycle initiated by its respective processor that is destined for the EISA bus 42. When such a cycle is detected, a timer is loaded and an indicating signal is asserted. When the EISA cycle completes, the timer begins counting out a preset delay. If the interrupt controller I/O tracker logic detects a processor write to the respective ports in the interrupt controller 140 at any time after the timer is loaded or while the timer is counting down, the tracker logic 142 extends the local bus cycle until the timer counts down to zero. This operates to extend the local bus write cycle until the expansion bus cycle has completed, with an additional delay caused by the timer after the expansion bus cycle has completed to allow the interrupt request time to clear back at the interrupt controller 140.

Figure 4:
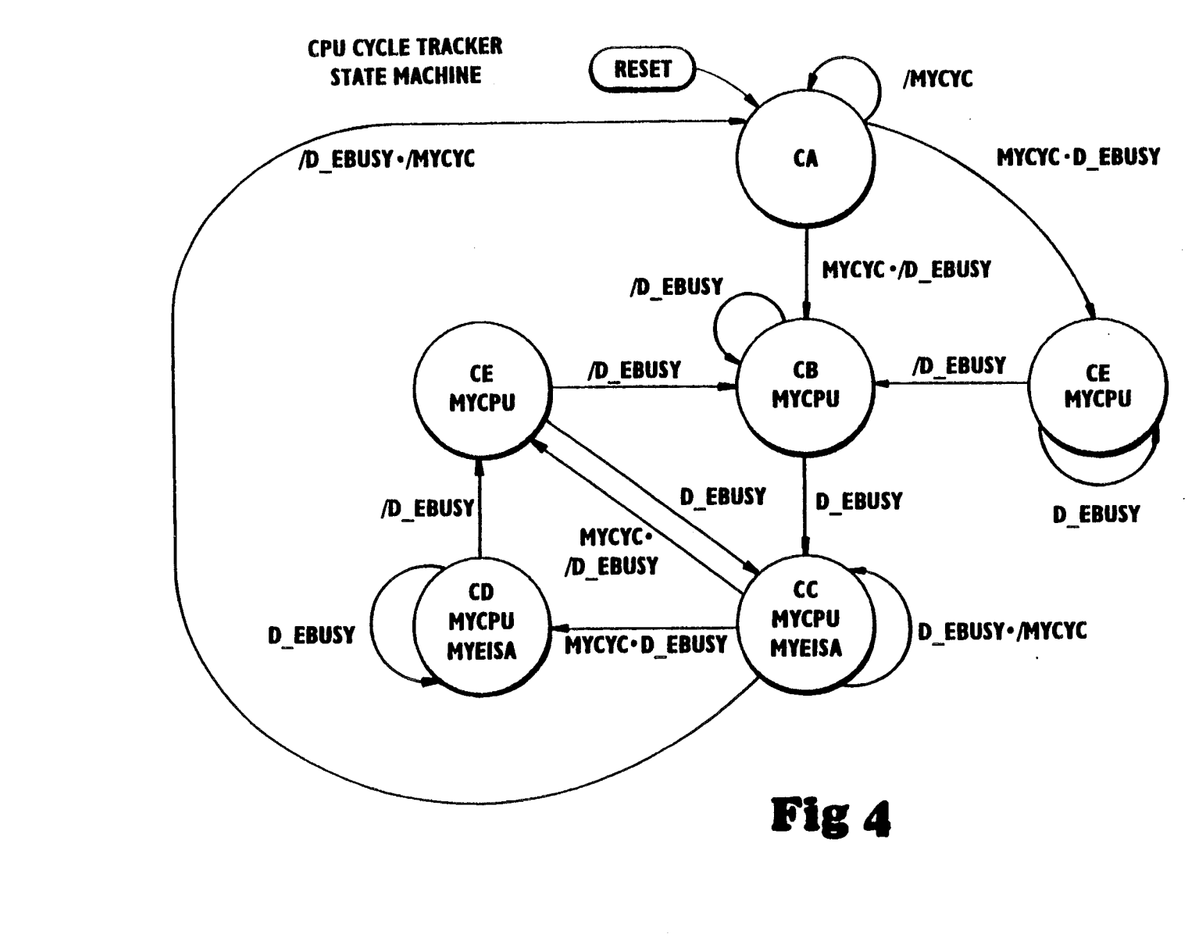
FIG. 4 is a state transition diagram illustrating operation of CPU cycle tracker logic in the tracker logic of FIG. 3.

Referring now to FIG. 4, a state machine illustrating operation of the CPU cycle tracker logic is shown. The state machine includes 6 states referred to as CA, CB, CC, CD, CE and CF. A brief review of certain signals used in the CPU cycle tracker logic is deemed appropriate. The HCLK signal is a clocking signal having a frequency of 25 or 33 MHz and is one half the frequency of the processor clocking signal referred to as PCLK, which is preferably either 50 or 66 MHz, respectively. A signal referred to as MYCYC is a host bus cycle indicator. When the MYCYC signal is asserted, this indicates that the cache controller 108 associated with the respective DSP 126 has started a cycle on the host bus 24 that is destined for the EISA bus 42 and that this cycle will not be "backed off", i.e., interrupted or temporarily discontinued, by the EBC 40. The signal is thus used to track EISA cycles. The MYCYC signal is asserted for 1 HCLK signal cycle. A signal referred to as EBUSY is an EISA busy indicator signal. When asserted, the signal indicates that a cycle is currently in progress on the EISA bus 42. A signal referred to as D_EBUSY is a one HCLK signal cycle delayed version of the EBUSY signal. The D_EBUSY signal is used in the state machine to prevent glitches from occurring if the EBUSY signal was used. The state machine generates a signal referred to as MYCPU. The MYCPU signal is asserted when the DSP's respective processor is executing a cycle on the host bus 24 that is destined for the EISA bus 42 or if the cycle is executing on the EISA bus 42. The MYEISA signal is asserted when the respective processor is executing a cycle on the EISA bus 42.

Referring again to FIG. 4, signal names appearing alone in the state diagram are deemed asserted, and signal names preceded by a slash are negated. The state machine begins in state CA, and all states lead to this state upon a system reset. The state machine remains in state CA while the MYCYC signal is negated. Here the state machine is waiting for the respective cache controller 108 to begin a cycle on the host bus 24 that is destined for the EISA bus 42. The state machine advances from state CA to state CB when the condition

MYCYC·/D_EBUSY is true. Thus the state machine advances from state CA to state CB when a cycle from the respective cache controller 108 has begun a cycle on the host bus 24 that is destined for the EISA bus 42. The MYCPU signal is asserted in state CB. The state machine advances from state CA to state CF when the condition

MYCYC·D_EBUSY is true. Thus, the state machine advances from state CA to state CF when a cycle from the respective cache controller 108 has started on the host bus 24 and is destined for the EISA bus 42 and a cycle is currently executing on the EISA bus 42 that has not yet completed. This condition is allowable as the EISA cycle can be posted by the EBC 40. In state CF, the MYCPU signal is asserted. The state machine remains in state CF while the D_EBUSY signal is asserted, allowing the current EISA bus cycle to complete. When the D_EBUSY signal is negated in state CF, indicating that the posted EISA cycle can become the active EISA cycle, the state machine advances from state CF to state CB.

The state machine remains in state CB while the D_EBUSY signal is negated. Here the state machine is waiting for an EISA cycle to begin. The state machine advances from state CB to state CC when the D_EBUSY signal is asserted, meaning that the host bus cycle that was indicated by the MYCYC signal has now propagated to the EISA bus 42. In state CC, both the MYCPU and the MYEISA signals are asserted. The state machine remains in state CC while the condition

D_EBUSY·/MYCYC is true. Here, if the MYCYC signal is deasserted, then the processor 102 has not begun a new cycle on the host bus 24 that is destined for the EISA bus 42. The state machine returns from state CC to state CA when the condition

/D_EBUSY·/MYCYC is true. Thus, the state machine returns to state CA when the current EISA cycle completes if a new processor cycle has not begun on the host bus 24 that is destined for the EISA bus 42.

The state machine advances from state CC to state CE when the condition

MYCYC·/D_EBUSY is true. Thus, the state machine advances from state CC to state CE if the current EISA cycle has completed and the processor 102 has started a new cycle on the host bus 24 that is destined for the EISA bus 42. The MYCPU signal is asserted in state CE. The state machine advances from state CC to state CD if the condition

MYCYC·D_EBUSY is true. Thus the state machine advances from state CC to state CD if the current EISA cycle has not yet completed and the processor 102 has started a new cycle on the host bus 24 that is destined for the EISA bus 42. In state CD, both the MYCPU and MYEISA signals are asserted. The state machine remains in state CD while the D_EBUSY signal is asserted, i.e., until the EISA cycle completes. When the EISA cycle completes in state CD, signified by the D_EBUSY signal being negated, the state machine advances from state CD to state CE.

If the D_EBUSY signal is asserted in state CE, meaning that another EISA cycle has begun, the state machine advances to state CC. The state machine returns from state CE to state CB on the next HCLK signal cycle if the D_EBUSY signal is negated. As previously discussed, the state machine remains in state CB while the D_EBUSY signal remains negated and advances from state CB to state CC after an EISA bus cycle begins, signified by the D_EBUSY signal being asserted. In state CC, the state machine advances to either of state CD or CE if the MYCYC signal is asserted, indicating that the processor 102 associated with the respective DSP 126 has begun another cycle on the host bus 24 that is destined for the EISA bus 42. If the MYCYC signal is not asserted in state CC, indicating that the respective processor 102 has not generated a new host bus cycle destined for the EISA bus 42, then the state machine remains in state CC until the current EISA cycle completes and then returns to state CA when the D_EBUSY signal is negated.

Figure 5:
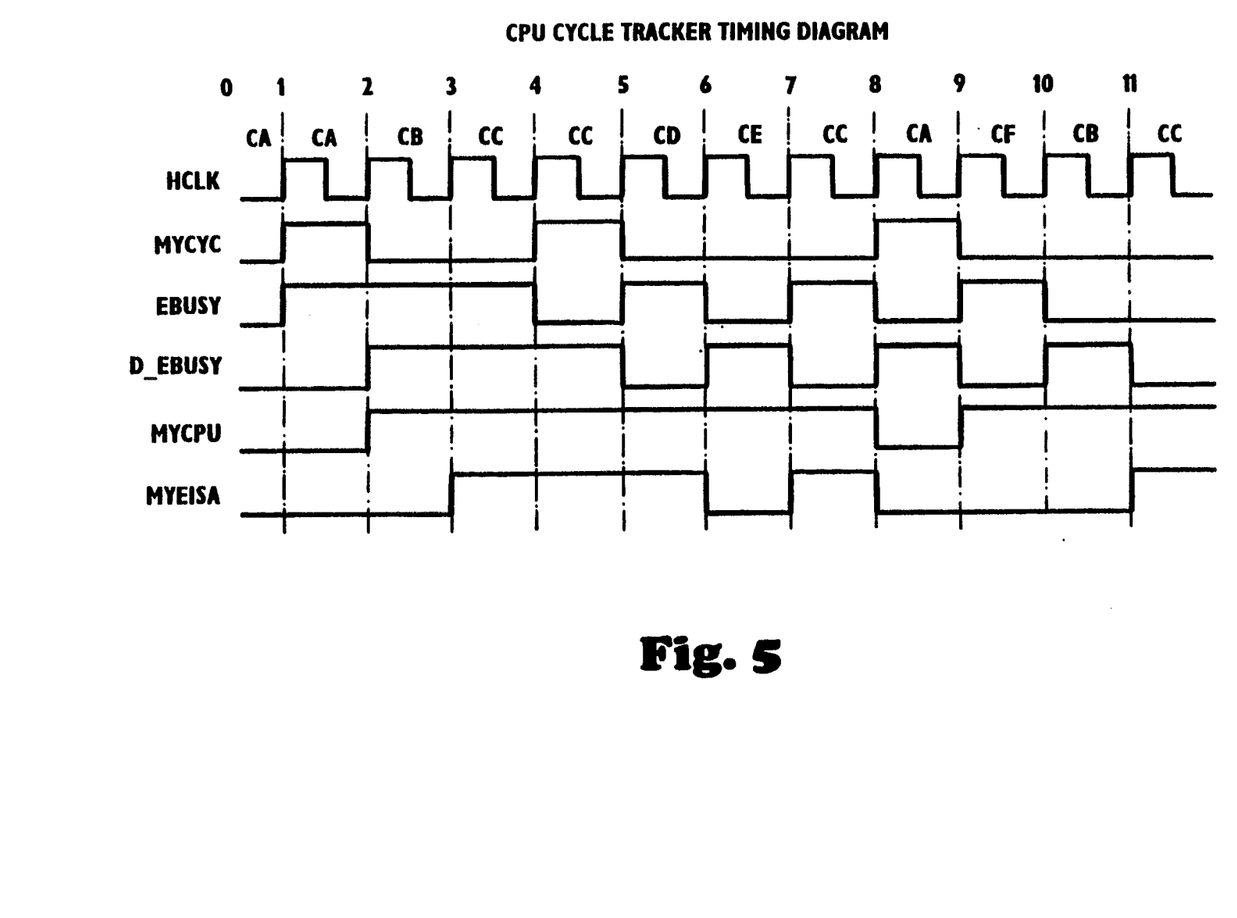
FIG. 5 is a timing diagram illustrating operation of the CPU cycle tracker state machine of FIG. 4.

Thus, the CPU cycle tracker logic tracks cycles generated by the respective CPU board (CPU0 20) and asserts the MYCPU signal when a respective processor cycle is executing on the host bus 24 that is destined for the EISA bus 42 or if a processor cycle is actually executing on the EISA bus 42. Referring now to FIG. 5, a timing diagram illustrating operation of the CPU cycle tracker state machine is shown. Due to the length of EISA bus cycles relative to the HCLK signal, the timing illustrated in the timing diagram has been condensed, particularly with regard to the length of time the EBUSY signal is asserted.

The state machine begins in state CA at time 0. At time 1, the MYCYC signal and the EBUSY signal are asserted. The asserted EBUSY signal indicates that a cycle has begun on the EISA bus 42. The D_EBUSY signal remains negated low at time 1. Also, the state machine remains in state CA at time 1. At time 2, the D_EBUSY signal is asserted high because the E_BUSY signal was asserted in the previous cycle at time 1. At time 2, the state machine transitions to state CB due to the MYCYC signal being asserted and the MYCPU signal is asserted. The MYCYC signal is negated at time 2. Here the cache controller 108 has begun a cycle on the host bus 24 that is destined for the EISA bus 42. The D_EBUSY signal remains asserted at time 3 and the state machine transitions to state CC at time 3 due to the D_EBUSY signal being asserted. In state CC, the MYEISA signal is asserted, indicating that the host bus cycle has propagated to the EISA bus 42.

At time 4, the MYCYC signal is again asserted and the EBUSY signal is negated, indicating completion of the EISA cycle. The D_EBUSY signal remains asserted and the state machine remains in state CC. At time 5, the state machine transitions to state CD due to both the MYCYC and the D_EBUSY signals being asserted. Also, at time 5 both the MYCYC signal and the D_EBUSY signal are negated and the EBUSY signal is asserted. At time 6, the state machine transitions from state CD to state CE due to the D_EBUSY signal being negated. The EBUSY signal is negated at time 6 and the D_EBUSY signal is asserted high at time 6. Also, the MYEISA signal is negated at time 6.

At time 7, the state machine transitions from state CE to state CC due to the D_EBUSY signal being asserted. At time 7, the D_EBUSY signal is negated low and the MYEISA signal is again asserted. At time 8, the state machine transitions from state CC to state CA due to both the MYCYC and D_EBUSY signals being negated. Here, the respective processor 102 has not generated a new host bus cycle destined for the EISA bus 42, and thus the state machine returns to state CA when the current EISA cycle has completed. At time 8, both the MYCYC and the D_EBUSY signals are asserted and the EBUSY signal is negated. In state CA, the MYCPU and MYEISA signals are negated.

At time 9, the state machine transitions from state CA to state CF due to both of the MYCYC and D_EBUSY signals being asserted. In this instance, a cycle from the respective cache controller 108 has started on the host bus 24 and is destined for the EISA bus 42 and a cycle is currently executing on the EISA bus 42 that has not yet completed. The MYCPU signal is asserted at time 9 due to this transition. Also, at time 9, the MYCYC and D EBUSY signals are negated, and the EBUSY signal is asserted. At time 10, the state machine transitions from state CF to state CB due to the D EBUSY signal being negated. At time 10, the D_EBUSY signal is asserted and the EBUSY signal is negated. At time 11, the state machine transitions from state CB to state CC due to the asserted D_EBUSY signal. The MYEISA signal is also asserted at time 11 and the D_EBUSY signal is negated. The state machine then continues in this manner, tracking the operation of EISA cycles on the EISA bus 42.

Figure 6A:
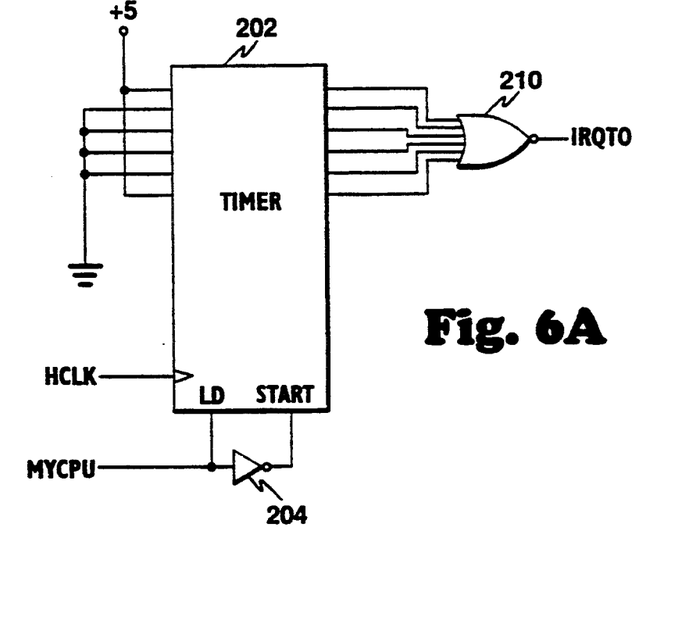
FIG. 6A illustrates a timer controlled by the CPU cycle tracker logic of FIG. 3.

Referring now to FIG. 6A, a 6 bit timer 202 located in the tracker logic 142 in the DSP 126 is shown. The timer 202 includes a clock input which receives the HCLK signal. The MYCPU signal generated by the CPU cycle tracker logic is connected to the load input of the timer 202 and is connected through an inverter 204 to the start input of the timer 202. In one embodiment, a port (not shown) containing a delay value has its inputs connected to the processor data bus and its outputs connected to data inputs of the timer 202. If a 66 MHz processor 102 is being used, the port is preferably programmed with a 1 microsecond delay. If the processor 102 is operating at 50 MHz, then the port preferably holds a 1.33 microsecond value delay. In the preferred embodiment, the processor 102 operates at 50 MHz and the data inputs of the timer 202 are preset to the value 34 to provide slightly more than a 1.33 microsecond delay. Other delays may of course be used with other types of processors.

The six outputs of the timer 202 are connected to inputs of a six input NOR gate 210 whose output is a signal referred to as IRQTO. Therefore, when an EISA cycle starts on the EISA bus 42, the MYCPU signal is asserted and the timer 202 is loaded with the delay value on the rising edge of the HCLK signal. When the timer 202 is loaded, the IRQTO signal is negated. When the EISA cycle ends, the MYCPU signal is negated and the timer 202 is begun on the rising edge of the HCLK signal. The timer 202 counts down from 34 to 0, i.e., counts 34 HCLK signal cycles. While the timer 202 is counting, the IRQTO signal remains negated until the timer counts down to 0, at which time, the IRQTO signal is asserted. The timer count remains at 0 and the IRQTO signal remains asserted until the timer 202 is re-loaded.

Figure 6B:
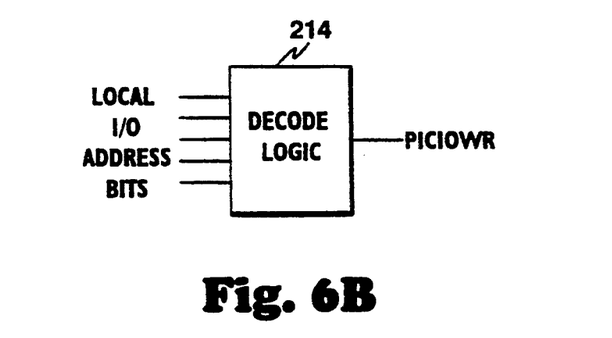
FIG. 6B illustrates decode logic in the tracker logic of FIG. 3.

Referring now to FIG. 6B, the tracker logic 142 also includes decode logic 214 which asserts the PICIOWR signal if a processor write is occurring to either of ports 20H, 21H, A0H, or A1H and generates a signal referred to as PICIOWR. The decode logic 214 receives the five local address bits from the cache interface logic 120 and determines if an interrupt controller port is being accessed. If a write access to these ports in the interrupt controller is detected by the decode logic 214 before the timer 202 expires, i.e., while the IRQTO signal is negated, then the interrupt controller I/O tracker logic is enabled to extend the local bus cycle, as discussed below.

Figure 8:
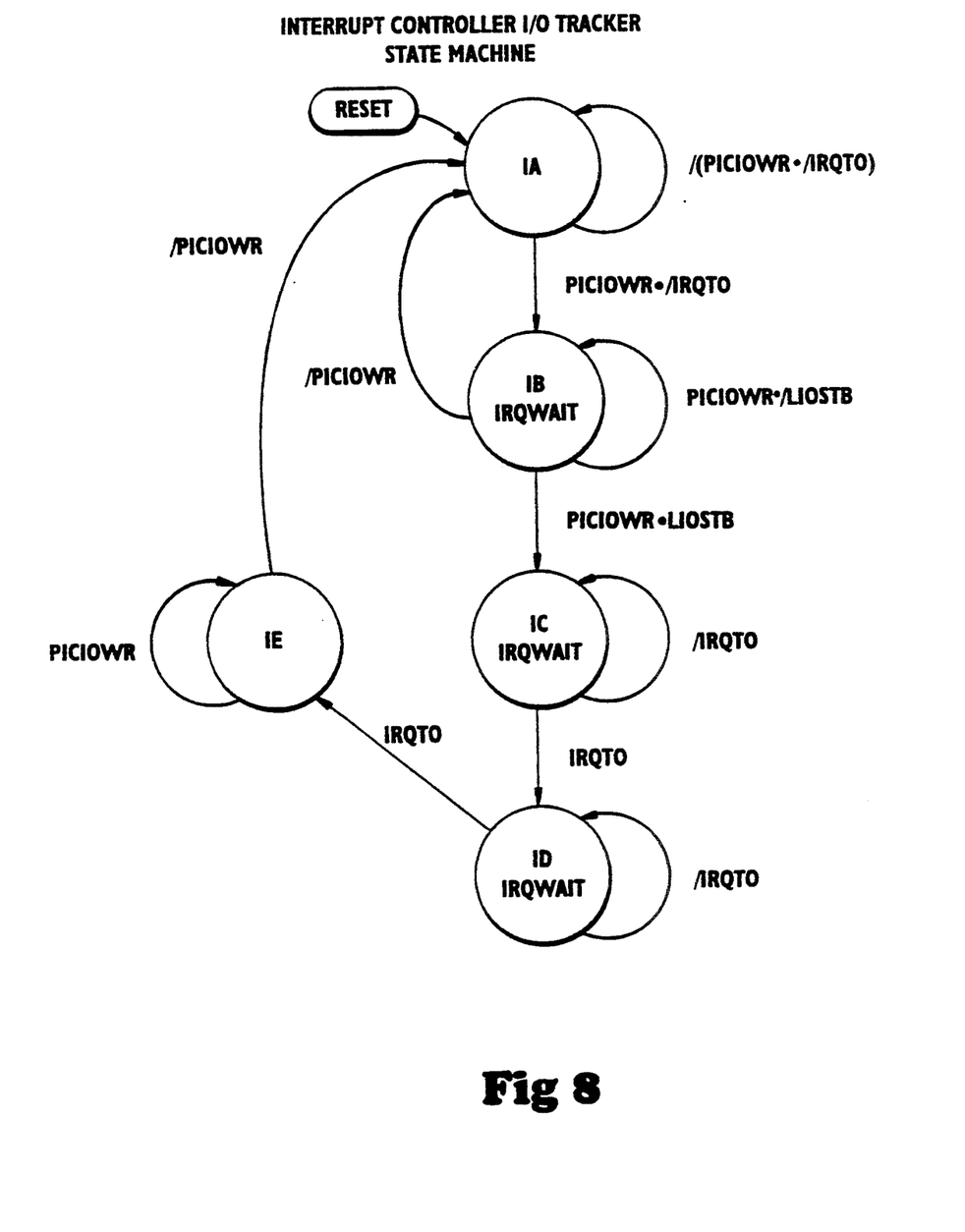
FIG. 8 is a state transition diagram illustrating operation of interrupt controller I/O tracker logic in the tracker logic of FIG. 3.

Referring now to FIG. 8, a state machine illustrating operation of the interrupt controller I/O tracker logic is shown. A brief review of certain signals used in the interrupt controller I/O tracker logic is deemed appropriate. As discussed above, the PICIOWR signal decodes a processor write to ports 20h, 21h, A0h, or A1h in the interrupt controller 140. A signal referred to as LIOSTB is a local I/O bus timing strobe signal that is used to clock data into and out of the DSP 126. The LIOSTB signal indicates the HCLK signal cycle on which the actual read or write data is valid on the local I/O data bus. Write data is clocked into the DSP 126 on the rising edge of the HCLK signal after the LIOSTB signal is negated. Read data is also valid on the rising edge of the HCLK signal after the LIOSTB signal is negated. A signal referred to as IRQWAIT is generated by the interrupt controller I/O tracker logic and indicates when the local I/O bus 125 should be extended to delay a processor write to the interrupt controller 140. A signal referred to as LEXRDY is a local I/O extend cycle indicator signal. The asserted LEXRDY signal extends the length of the local I/O cycle by preventing the LIOSTB signal from being negated.

Figure 7:
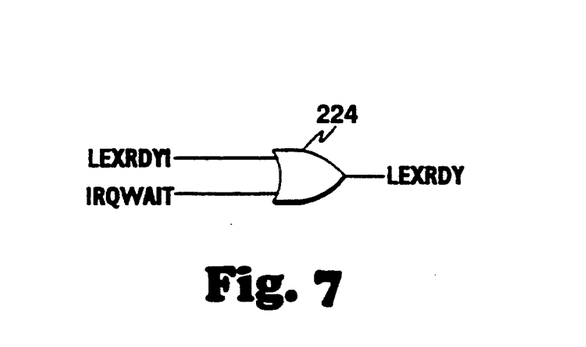
FIG. 7 illustrates logic in the tracker logic of FIG. 3 which generates a local bus cycle extension signal.

The manner in which the IRQWAIT signal extends a local I/O bus cycle is as follows. As shown in FIG. 7, the IRQWAIT signal is connected to an input of a two input OR gate 224. The other input of the OR gate 224 receives a signal referred to as LEXRDY1. The LEXRDY1 signal is asserted low when both a local I/O bus cycle and a MUX bus cycle are simultaneously occurring to the DSP 126 to delay the local I/O bus cycle. The output of the OR gate 224 is the LEXRDY signal. Thus the LEXRDY signal is asserted on either of two conditions, one being when simultaneous local I/O bus and MUX bus cycles occur to the DSP 126, and the other being when IRQWAIT is asserted according to the present invention to delay a processor write to the interrupt controller 140 from being executed before the device that caused the interrupt has had its interrupt cleared.

The LEXRDY signal is provided (not shown) to the cache data buffer 124 which in turn provides (not shown) a ready signal referred to as LIORDY to the cache interface logic 120. When the LEXRDY signal is asserted to the cache data buffer 124, the data buffer 124 does not assert the LIORDY signal to the cache interface logic 120 until the LEXRDY signal is negated. Thus, while the LEXRDY signal is asserted, the current local I/O cycle, which in this case is a processor write to the interrupt controller 140, is not allowed to complete. Also, the cache controller 108 and the cache interface logic 120 cannot instigate any new host cycles onto the host bus 24. Therefore, the CPU cycle tracker state machine will advance from state CC to state A when a local I/O cycle is delayed and the current EISA bus cycle completes. When the state machine returns to state CA, the MYCPU signal is negated and the timer 202 is begun to count out the additional delay period after the EISA cycle completes.

The interrupt controller I/O tracker state machine includes 5 states referred to as IA, IB, IC, ID and IE. The state machine begins in state IA, and all states lead to this state upon a system reset. The state machine transitions on the rising edge of the HCLK signal. The state machine remains in state IA while either the PICIOWR signal is negated or the IRQTO signal is asserted. When the PICIOWR signal is asserted and the IRQTO signal is negated, indicating that the interrupt controller 140 is being accessed by the processor 102 and the timer 202 either has been loaded or is counting down, the state machine transitions to state IB. In state IB the IRQWAIT signal is asserted to extend the current local I/O bus cycle as described above.

The state machine remains in state IB while the PICIOWR signal is asserted and the LIOSTB signal is negated. If the PICIOWR signal is negated in state IB, the state machine returns to state IA. This condition may occur since the PICIOWR signal may not meet setup to the first HCLK signal cycle and therefore may be erroneously asserted momentarily. The IA to IB state transition must be unit distance to avoid metastability problems. If the PICIOWR signal remains asserted and the LIOSTB signal is asserted, the state machine advances from state IB to state IC.

The interrupt controller I/O tracker state machine remains in state IC while the IRQTO signal is negated, i.e., while the timer 202 is counting down to 0. The IRQWAIT signal is asserted in state IC. When the timer 202 counts down to 0 and the IRQTO signal is asserted, the state machine advances from state IC to state ID. State ID performs essentially the same function as state IC, and, although generally unnecessary, state ID is included to extend the effective timeout by one more HCLK signal cycle. The state machine is in state ID for one HCLK signal cycle and then advances to state IE. The state machine remains in state IE while the PICIOWR signal is asserted, and the IRQWAIT signal is negated in state IE. When the PICIOWR signal is negated as a result of the write operation completing now that the LEXRDY signal has been released and the wait period has ended, the state machine returns to state IA.

Figure 9:
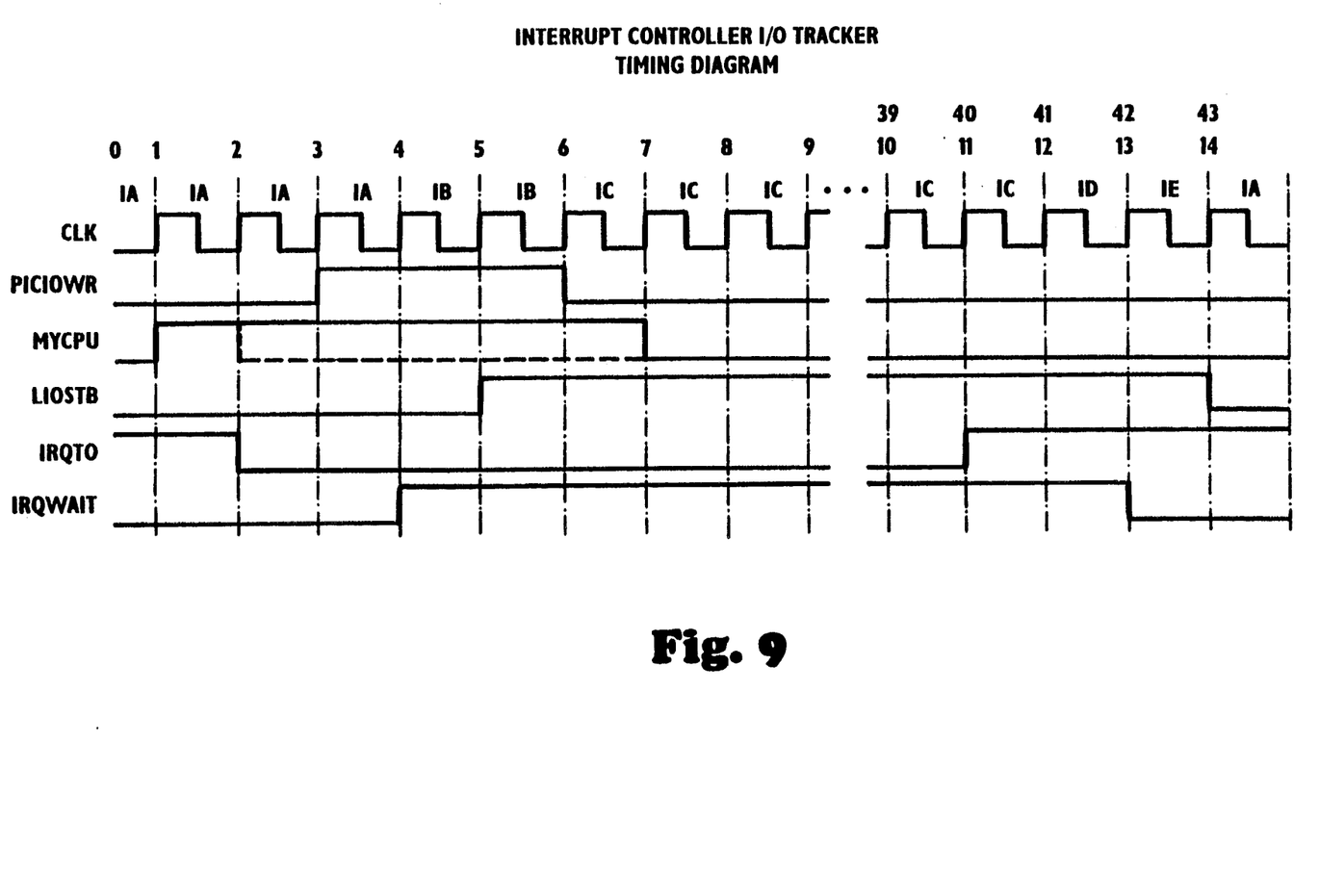
FIG. 9 is a timing diagram illustrating operation of the interrupt controller I/O tracker state machine of FIG. 8.

Referring now to FIG. 9, a timing diagram illustrating operation of the interrupt controller I/O tracker state machine is shown. The state machine begins in state IA at time 0. At time 1, the MYCPU signal is asserted, causing the timer 202 to be loaded with a value. This is assumed to be the cycle which is to clear the interrupting device. The asserted MYCPU signal causes the IRQTO signal to be asserted on the subsequent HCLK signal cycle at time 2. The state machine remains in state IA at time 2. At time 3, the PICIOWR signal is asserted, indicating that the processor 102 is performing a local I/O access to a respective port in the interrupt controller 102, the EOI instruction write for purposes of this example. The asserted PICIOWR signal at time 3 causes the state machine to transition from state IA to state IB at time 4, which causes the IRQWAIT signal to be asserted. The LIOSTB signal is asserted at time 5. The state machine transitions from state IB to state IC at time 6 due to the asserted LIOSTB signal and the asserted PICIOWR signal. At time 6, the PICIOWR signal is negated. At time 7, the MYCPU signal is negated, indicating that the EISA cycle has completed. The state machine remains in state IC for 34 HCLK signal cycles after the MYCPU signal is negated in the preferred embodiment.

When the timer 202 finishes counting down to zero, the IRQTO signal is asserted at time 11, causing the state machine to transition from state IC to state ID at time 12. The state machine then advances to state IE on the next HCLK signal cycle, and the IRQWAIT signal is negated low. The state machine then returns to state IA on the next rising edge of the HCLK signal at time 14 because the PICIOWR signal is negated. The LIOSTB signal is also negated at time 14.

The asserted IRQWAIT signal from time 4 to time 13 causes the LEXRDY signal to be asserted to the cache data buffer 124 which in turn prevents the LIORDY signal from being returned to the cache interface logic 120. This prevents the local I/O bus write cycle to the interrupt controller 140 from completing until one microsecond after the EISA cycle to clear the requesting device completes. This ensures strict ordering of these cycles and prevents the occurrence of spurious interrupts.

Therefore, a method and apparatus for maintaining strict ordering of interrupt I/O operations to main interrupt system integrity is disclosed. The interrupt system operates such that the processor 102 must clear the I/O device causing an interrupt on the EISA bus 42 and then generate a write operation to the interrupt controller 140, such as an EOI instruction. Due to the local nature of the interrupt controller 140, this write cycle could erroneously occur before the device that caused the interrupt has been serviced and cleared, thus causing the interrupt controller to believe that it is receiving another interrupt and degrading system performance. Therefore, the tracker logic 142 monitors the operation of I/O cycles on the expansion bus and prevents write accesses to the interrupt controller 140 from occurring during an expansion bus cycle and for a period of time after the expansion bus cycle completes to guarantee that the interrupt has cleared all the way back to the input of the interrupt controller 140 before the write operation is completed.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An apparatus for maintaining interrupt system integrity in a computer system comprising a host bus, a CPU board coupled to the host bus and including a processor and interrupt controller logic, an expansion bus coupled to the host bus, and interrupt receive logic coupled to the expansion bus, the interrupt receive logic receiving interrupt requests from devices coupled to the expansion bus and providing the interrupt requests to the interrupt controller logic, the apparatus comprising:

monitoring means for coupling to the interrupt controller logic and the host bus for monitoring cycles on the host bus and the expansion bus and for determining if an expansion bus cycle is requested by the processor or if an expansion bus cycle requested by the processor is being performed;

determining means for coupling to the interrupt controller logic and coupled to said monitoring means for determining if the processor is accessing the interrupt controller; and extending means coupled to said monitoring means and said determining means and for coupling to the host bus for extending said interrupt controller access by the processor if said expansion bus cycle is requested by the processor or said expansion bus cycle requested by the processor is being performed and the processor is concurrently accessing the interrupt controller.

2. The apparatus of claim 1, wherein said extending means extends said interrupt controller access by the processor for a period of time after said expansion bus cycle completes.

3. The apparatus of claim 2, wherein said extending means includes a timer, wherein said timer is loaded when the processor requests said expansion bus cycle and begins counting down after said expansion bus cycle completes.

4. The apparatus of claim 1, wherein said interrupt controller access by the processor is execution of an end of interrupt instruction.

5. A method for maintaining interrupt system integrity in a computer system comprising a host bus, a CPU board coupled to the host bus, the CPU board including a processor and interrupt controller logic an expansion bus coupled to the host bus and interrupt receive logic coupled to the expansion bus, the interrupt receive logic receiving interrupt requests from devices coupled to the expansion bus and providing the interrupt requests to the interrupt controller logic, the method comprising:

monitoring cycles on the host bus and the expansion bus to determine if an expansion bus cycle is requested by the processor or if an expansion bus cycle requested by the processor is being performed;

determining if the processor in accessing the interrupt controller; and extending said interrupt controller access if said expansion bus cycle is requested by the processor or if an expansion bus cycle requested by the processor is being performed and the processor is concurrently accessing the interrupt controller.

6. The method of claim 5, wherein said step of extending extends said interrupt controller access for a period of time after said expansion bus cycle completes.

7. The method of claim 6, wherein said interrupt controller access is execution of an end of interrupt instruction.

8. A computer system which enforces strict ordering of interrupt accepts cycles, comprising:
a host bus;
a CPU board coupled to said host bus and including a processor and interrupt controller logic;
an expansion bus coupled to said host bus;
devices coupled to said expansion bus;
interrupt receive logic coupled to said expansion bus, the interrupt receive logic receiving interrupt requests from said devices coupled to said expansion bus and said interrupt requests to said interrupt controller logic;
monitoring means coupled to said interrupt controller logic, said host bus and said expansion bus for monitoring cycles on said host bus and for determining if an expansion bus cycle is requested by said processor or if an expansion bus cycle requested by said processor is being performed;
determining means coupled to said interrupt controller logic and said monitoring means for determining if said processor is accessing said interrupt controller; and
extending means coupled to said monitoring means and said determining means and for coupling to said host bus for extending aid interrupt controller access by said processor if said expansion bus cycle is requested by said processor or said expansion bus cycle requested by said processor is being performed and said processor is concurrently accessing said interrupt controller.

* * * * *

UNITED STATES PATENT AND TRADEMARK OFFICE
CERTIFICATE OF CORRECTION

PATENT NO. : 5,367,689
DATED : November 22, 1994
INVENTOR(S) : Dale J. Mayer, et al.

It is certified that error appears in the above-identified patent and that said Letters Patent is hereby corrected as shown below:

In col. 16, ln. 48, after "logic" please insert --;--.

In col. 16, ln. 49, after the second occurrence of "bus" please insert --;--.

In col. 16, ln. 59, please replace "in" with --is--.

In col. 17, ln. 14, after "and" please insert --providing--.

In col. 18, ln. 11, please replace "aid" with --said--.

Signed and Sealed this

Twenty-fifth Day of April, 1995

Attest:

BRUCE LEHMAN

Attesting Officer

Commissioner of Patents and Trademarks